US011295222B2

(12) United States Patent
Lin et al.

(10) Patent No.: US 11,295,222 B2
(45) Date of Patent: Apr. 5, 2022

(54) MACHINE FAILURE ANALYZING SYSTEM AND WEARABLE ELECTRONIC DEVICE HAVING MACHINE FAILURE ANALYZING FUNCTION

(71) Applicant: WE JUMP INTELLIGENT PERCEPTION CO., LTD., Taipei (TW)

(72) Inventors: Min-Ying Lin, Taipei (TW); Po-Shih Chiang, Taipei (TW)

(73) Assignee: WE JUMP INTELLIGENT PERCEPTION CO., LTD., Taipei (TW)

( * ) Notice: Subject to any disclaimer, the term of this patent is extended or adjusted under 35 U.S.C. 154(b) by 188 days.

(21) Appl. No.: 16/660,917

(22) Filed: Oct. 23, 2019

(65) Prior Publication Data

US 2021/0089940 A1 Mar. 25, 2021

(30) Foreign Application Priority Data

Sep. 24, 2019 (TW) .................................. 108134394

(51) Int. Cl.
*G06N 5/04* (2006.01)
*G05B 23/02* (2006.01)
(Continued)

(52) U.S. Cl.
CPC ........... *G06N 5/04* (2013.01); *G05B 23/0283* (2013.01); *G06N 20/00* (2019.01); *H04L 67/12* (2013.01); *H04L 41/147* (2013.01)

(58) Field of Classification Search
CPC ...... G06N 5/04; G06N 20/00; G05B 23/0283; G05B 23/0278; G05B 23/0267;
(Continued)

(56) References Cited

U.S. PATENT DOCUMENTS 7,100,085 B2 * 8/2006 Miller ................. G06F 11/0748
714/20
10,263,836 B2 * 4/2019 Jain ..................... H04L 41/0672
(Continued)

FOREIGN PATENT DOCUMENTS

JP 5370905 B2 * 12/2013 .............. G06F 11/22

*Primary Examiner* — Tung S Lau
(74) *Attorney, Agent, or Firm* — Alan D. Kamrath; Karin L. Williams; Mayer & Williams PC

(57) ABSTRACT

A machine failure analyzing system includes a wearable electronic device is for a user to wear, a controlling and processing device provided with a machine history database and a failure causes analyzing unit. When a specific machine is malfunctioning or in a failure status, the controlling and processing device utilizes a machine status data collecting unit to collect machine status data from the specific machine. Subsequently, based on the machine status data, the failure causes analyzing unit is configured to find relative failure causes from the machine history database, thereby generating at least one troubleshooting solution. As such, under instructions of the troubleshooting solution, a field engineer who wears the wearable electronic device can achieve troubleshooting of the specific machine rapidly and precisely, without needing to spend time finding the failure causes.

11 Claims, 6 Drawing Sheets

(51) Int. Cl.
*H04L 67/12* (2022.01)
*G06N 20/00* (2019.01)
*H04L 41/147* (2022.01)

(58) Field of Classification Search
CPC .......... G05B 2219/36159; H04L 67/12; H04L 41/147; H04L 69/14; H04L 41/16; H04L 41/24
See application file for complete search history.

(56) References Cited

U.S. PATENT DOCUMENTS

| | | | |
|---|---|---|---|
| 2004/0260678 A1* | 12/2004 | Verbowski | G06F 11/079 |
| 2005/0102119 A1* | 5/2005 | Alvarez | G06Q 10/06 |
| | | | 702/183 |
| 2005/0210331 A1* | 9/2005 | Connelly | G06F 11/0709 |
| | | | 714/26 |
| 2007/0027893 A1* | 2/2007 | Gundy | H04L 41/5074 |
| 2007/0288795 A1* | 12/2007 | Leung | G05B 23/0275 |
| | | | 714/26 |
| 2008/0059120 A1* | 3/2008 | Xiao | G06F 11/0748 |
| | | | 702/184 |
| 2011/0270771 A1* | 11/2011 | Coursimault | G06Q 10/06 |
| | | | 705/304 |
| 2016/0292028 A1* | 10/2016 | Gamage | G06F 11/0772 |

\* cited by examiner

MACHINE FAILURE ANALYZING SYSTEM AND WEARABLE ELECTRONIC DEVICE HAVING MACHINE FAILURE ANALYZING FUNCTION

BACKGROUND OF THE INVENTION

1. Field of the Invention

The present invention relates to the field of machine repairing using artificial intelligence (AI), and more particularly to a machine failure analyzing system and a wearable electronic device having a machine failure analyzing function.

2. Description of the Prior Art

It is known that a specific-use process machine or an automated equipment commonly has several simple operation buttons. However, with the advancement of industrial science and technology, a technological machine is provided with an electronic control interface, allowing an operator to operate the technological machine by a simple and easy way. In fact, before the allowance of operating the technological machine, an operator was required to read an operating manual of the technological machine and was required to pass a qualifying test of the technology. Of course, it is not easy to complete troubleshooting or maintenance of the technological machine that is provided with an electronic control interface. Therefore, in a case when the technological machine shows a failure or malfunction alarm, an engineer is informed by the operator for executing an inspection or repairing of the technological machine. However, since the technological machine simultaneously consists of multi-mechanical structures and a few electronic control circuits, the engineer needs to first refer to the corresponding repair and maintenance manual so as to find the failure (or malfunction) causes of the technological machine, and then the engineer eventually finds a right solution to achieve the troubleshooting. However, practical experiences reveal that, an engineer needs to spend a lot of time reading the repair and maintenance manual, which causes the engineer to fail to find the failure causes and the related troubleshooting solutions while there is a compelling need. In the most severe case, before finding the exact failure (or malfunction) causes, the engineer may arbitrarily replace old machine part(s) with new machine part(s) or change machine settings without authorization, eventually resulting in an irreversible consequence.

Practical experiences also reveal that, once a junior engineer still fails to find a best troubleshooting solution after spending a lot of time reading the repair and maintenance manual, the junior engineer commonly gives a senior engineer who is in headquarters a call through a communication device, so as to report current machine status. As such, the senior engineer would find relative failure causes according to the reported machine status relying on his years of experience, thereby providing a best troubleshooting solution to the junior engineers through the communication device. On the other hand, some machine vendors make and provide a standard operation procedure (SOP) manual that records introductions of machine troubleshooting for their field engineers, such that the field engineer is able to complete the troubleshooting of a specific machine by referring to the SOP manual in case of the specific machine showing a failure or malfunction alarm.

In spite of the fact that the above-mentioned two ways are both helpful in shortening a time of completing the troubleshooting, the two ways still have shortcomings in practical use. For the former way, if the senior engineer has a day off or has resigned, it is not helpful for finishing the troubleshooting for the field engineer who calls headquarters through a communication device. For the latter way, it still requires the field engineer to spend a lot of time reading the SOP manual. In addition, some unknown failure causes that result from machine assembly defects or imperfection of machine parts would not be recorded in the general SOP manual, causing the field engineers to fail to find the failure causes and achieve the troubleshooting.

From above descriptions, it is understood that, there is a need to develop and provide a device or system for a field maintenance engineer to effectively shorten a whole time of finding failure causes of a malfunctioning machine as well as completing a troubleshooting. In view of that, inventors of the present application have made great efforts to make inventive research and eventually provided a machine failure analyzing system and a wearable electronic device having machine failure analyzing function.

SUMMARY OF THE INVENTION

The primary objective of the present invention is to disclose a machine failure analyzing system and a wearable electronic device having machine failure analyzing function, wherein the machine failure analyzing system includes a machine status data collecting unit, at least one wearable electronic device and a controlling and processing device. In the present invention, the wearable electronic device is for a user to wear, and the controlling and processing device is provided with a machine history database and a failure causes analyzing unit. When a specific machine is malfunctioning or in a failure status, the controlling and processing device utilizes the machine status data collecting unit to collect a variety of machine status data from the specific machine. Subsequently, based on the machine status data, the failure causes analyzing unit is able to find relative failure causes of the specific machine from the machine history database, thereby generating at least one troubleshooting solution. As such, under instructions of the troubleshooting solution, a field maintenance engineer who wears the wearable electronic device can achieve the troubleshooting of the specific machine rapidly and precisely, without needing to spend time finding the failure causes.

For achieving the primary objective of the present invention, the present invention provides an embodiment of the machine failure analyzing system, comprising:

a machine status data collecting unit, being configured for collecting a plurality of machine status data from at least one machine;

at least one wearable electronic device, being for a user to wear, and having a first communication unit; and a controlling and processing device, comprising:
  a second communication unit, being used for communicating with the first communication unit;
  a processor unit, being coupled to the second communication unit;
  a failure causes analyzing unit, being coupled to the processor unit; and
  a machine history database, being coupled to the failure causes analyzing unit and the processor unit, wherein there are a plurality of data of machine malfunction status, a plurality of data of machine failure causes, and a plurality of data of machine maintenance records stored in the machine history database;

wherein the processor unit receives the machine status data from the machine status data collecting unit through the second communication unit and the first communication unit, such that the failure causes analyzing unit finds the data of machine failure causes with respect to the machine status data from the machine history database, thereby generating at least one troubleshooting solution after subsequently finding the data of machine maintenance records that are corresponding to the data of machine failure causes;

wherein the processor unit transmits the troubleshooting solution to the wearable electronic device through the second communication unit and the first communication unit.

In addition, the present invention also provides an embodiment of the wearable electronic device having machine failure analyzing function, which is for a user to wear, and comprises:

a processor unit;

a machine status data collecting unit, being coupled to the processor unit, and being configured for collecting a plurality of machine status data from at least one machine;

a machine history database, being coupled to the processor unit, wherein there are a plurality of data of machine malfunction status, a plurality of data of machine failure causes, and a plurality of data of machine maintenance records stored in the machine history database;

a failure causes analyzing unit, being coupled to the processor unit and the machine history database; and a display unit, being coupled to the processor unit;

wherein the processor unit receives the machine status data from the machine status data collecting unit, such that the failure causes analyzing unit finds the data of machine failure causes with respect to the machine status data from the machine history database, thereby generating at least one troubleshooting solution after subsequently finding the data of machine maintenance records that is corresponding to the data of machine failure causes;

wherein the processor unit transmits the troubleshooting solution to the display unit, such that the troubleshooting solution is shown on the display unit by a mixed reality way.

In one embodiment, the machine is provided with a plurality of sensors, and the plurality of sensors are configured for sensing at least one machine status of the machine, so as to transmit the plurality of machine status data to the machine status data collecting unit.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a machine failure analyzing system and a wearable electronic device having machine failure analyzing function that are disclosed by the present invention, embodiments of the present invention will be described in detail with reference to the attached drawings hereinafter.

Machine Failure Analyzing System

Figure 1:
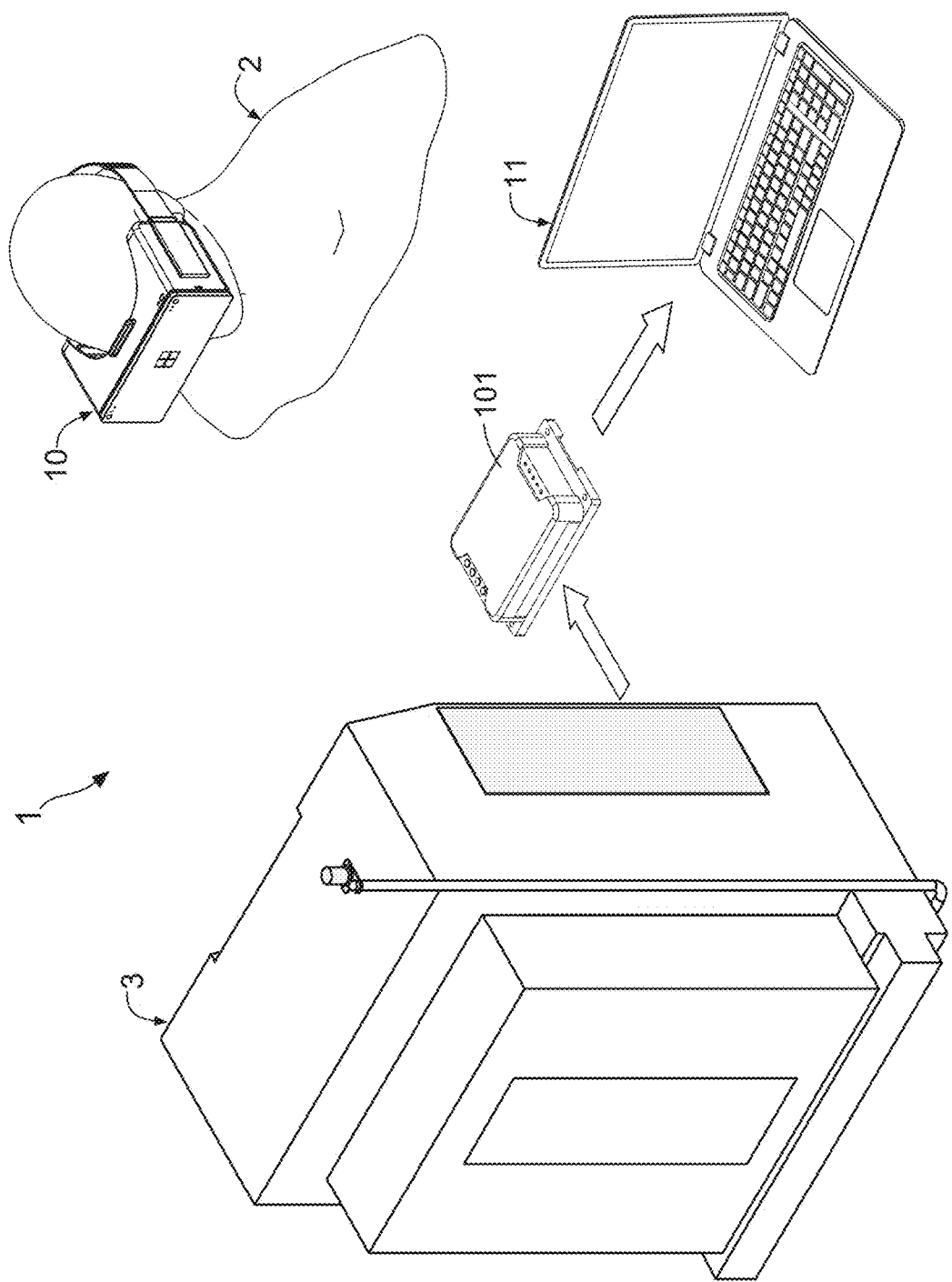
FIG. 1 shows a first framework view of a machine failure analyzing system according to the present invention.
Figure 2:
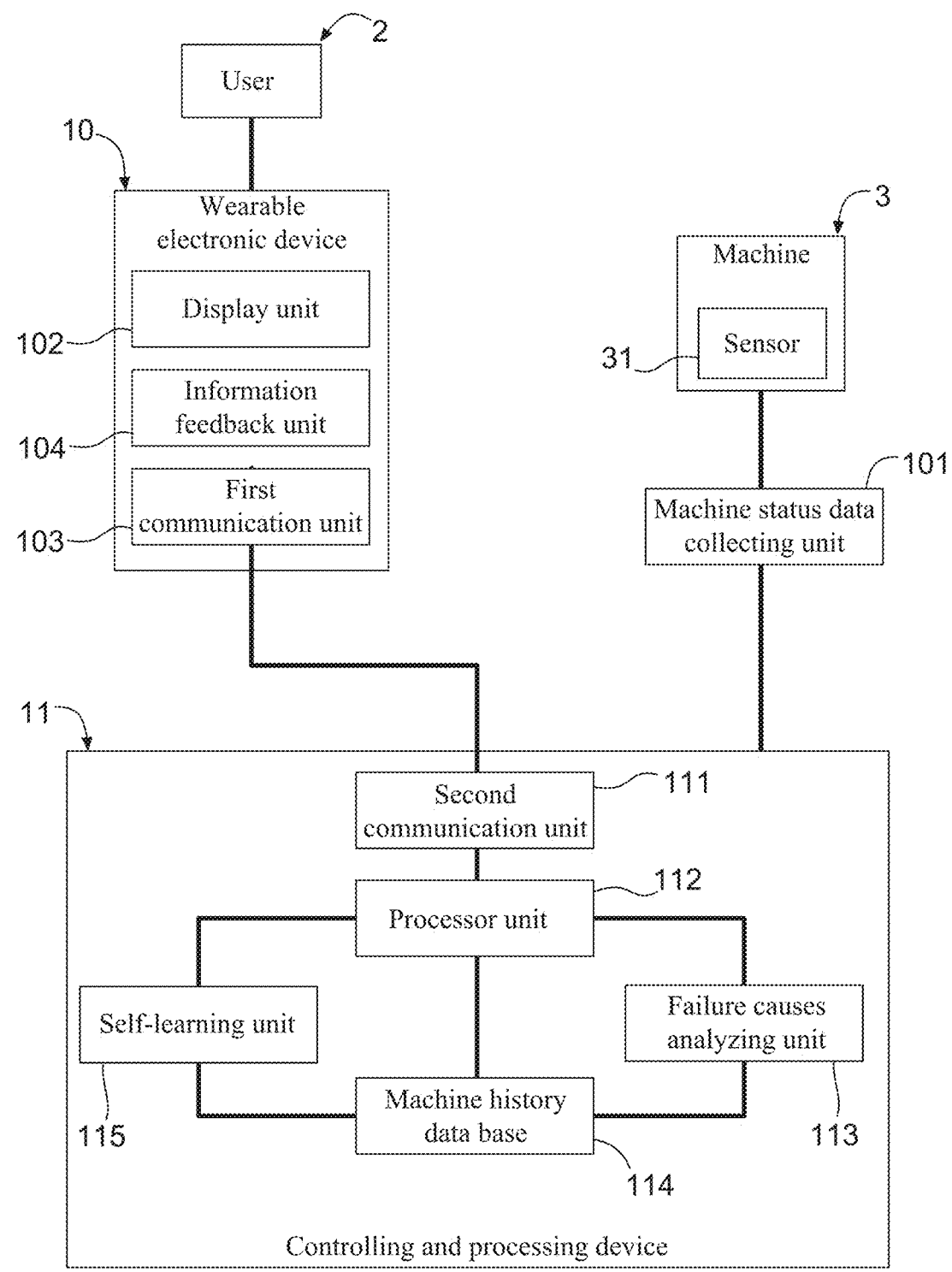
FIG. 2 shows a first function block diagram of the machine failure analyzing system.
Figure 3A:
FIG. 3A shows a stereo diagram for describing one practicable embodiment of a wearable electronic device of the machine failure analyzing system.
Figure 3B:
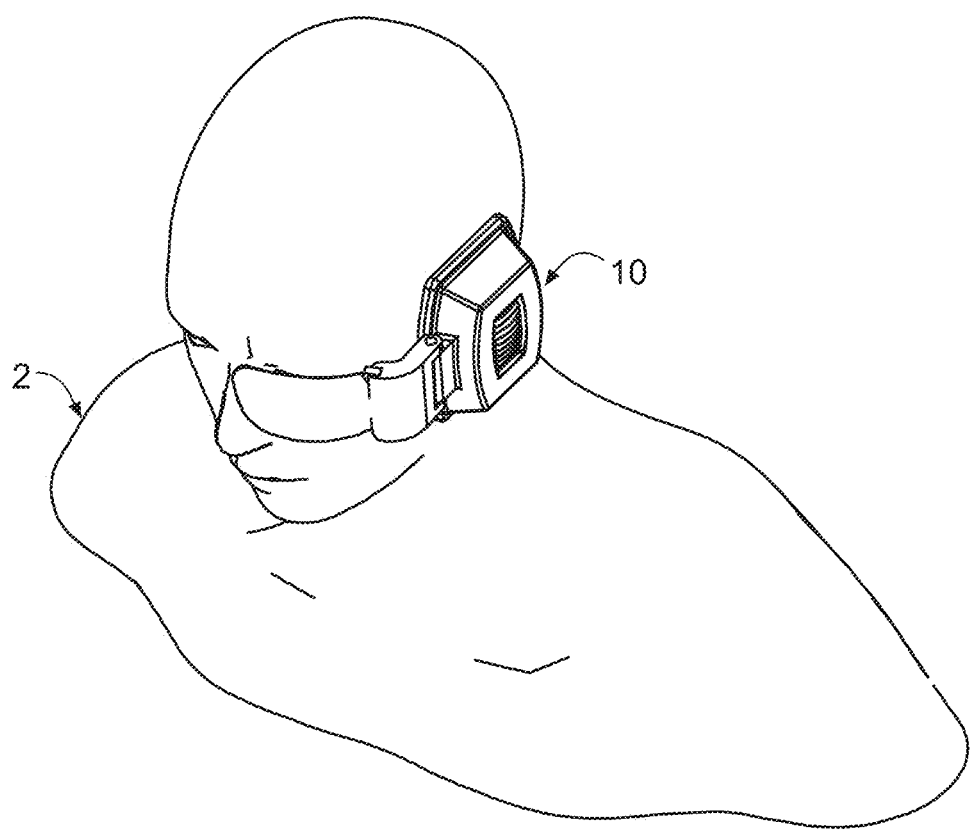
FIG. 3B shows a stereo diagram for depicting another one practicable embodiment of the wearable electronic device.

With reference to FIG. 1, there is shown a first framework view of a machine failure analyzing system according to the present invention. Moreover, FIG. 2 shows a first function block diagram of the machine failure analyzing system. As FIG. 1 and FIG. 2 show, the machine failure analyzing system 1 of the present invention includes a machine status data collecting unit 101, at least one wearable electronic device 10, and a controlling and processing device 11, wherein the machine status data collecting unit 101 is configured for collecting a plurality of machine status data from at least one machine 3. On the other hand, the wearable electronic device 10 is for a user to wear, and has a first communication unit 103 and a display unit 102. FIG. 1 depicts that the wearable electronic device 10 is a mixed reality (MR) headset. However, the MR headset is not a limited embodiment of the wearable electronic device 10. FIG. 3A and FIG. 3B respectively show a stereo diagram for describing practicable embodiment of the wearable electronic device 10 of the machine failure analyzing system 1. In one practicable embodiment, the wearable electronic device 10 can be one smart glasses shown as the diagram of FIG. 3A. In addition, FIG. 3B illustrates that the wearable electronic device 10 can also be a Dragonball Z scouter.

On the other hand, FIG. 1 shows the controlling and processing device 11 by a form of a laptop computer. However, a specific-use process machine or an automated equipment is commonly controlled by a central control system, and there are a variety of machine setting data stored in a database of the central control system. For above reason, it should be understood that, the laptop computer is not a limited embodiment of the controlling and processing device 11. In one practicable embodiment, the controlling and processing device 11 can be an industrial computer, a server computer, a central control computer, a desk computer, a laptop computer, a tablet computer, or a smart phone. As described more in detail below, FIG. 2 further shows that the controlling and processing device 11 includes a second communication unit 111 for communicating with the first communication unit 103, a processor unit 112 coupled to the second communication unit 111, a failure causes analyzing unit 113 coupled to the processor unit 112, and a machine history database 114. In which, the machine history database 114 is coupled to the failure causes analyzing unit 113 and the processor unit 112, and there are a plurality of data of machine malfunction status, a plurality of data of machine failure causes, and a plurality of data of machine maintenance records stored in the machine history database 114.

In general, the machine 3 is commonly provided with a plurality of sensors 31, wherein the plurality of sensors 31 are configured for sensing at least one machine status of the machine 3. As such, in case of the machine 3 is malfunctioning or in a failure status, the sensors 31 show a failure or malfunction alarm, such that the controlling and processing device 11 utilizes the machine status data collecting unit 101 to collect machine status data from the sensors 31. Subsequently, the failure causes analyzing unit 113 finds the data of machine failure causes with respect to the machine status data from the machine history database 114, thereby generating at least one troubleshooting solution after the data of machine maintenance records that are corresponding to the data of machine failure causes having been found from the machine history database 114. Consequently, the processor unit 112 transmits the troubleshooting solution to the wearable electronic device 10 through the second communication unit 111 and the first communication unit 103.

It is easy to understand that, both the first communication unit 103 and the second communication 111 can be a wired communication interface or a wireless communication interface. On the other hand, the wearable electronic device 10 further includes a display unit 102, such that the troubleshooting solution is able to be shown on the display unit 102 by a mixed reality way. It needs to further explain that, in the present invention, the troubleshooting solution includes a plurality of machine failures causes that are sequentially arranged and a plurality of machine maintenance records that are respectively relative to the plurality of machine failures. As such, under instructions of the troubleshooting solution, the user 2 (i.e., a field maintenance engineer) who wears the wearable electronic device 10 can achieve the troubleshooting of the machine 3 rapidly and precisely, without needing to spend time reading a repair and maintenance manual of the machine in order to find the failure causes. For example, when one machine 3 with serial number of 1 is malfunctioning, the field maintenance engineer who wears the wearable electronic device 10 is guided to complete a troubleshooting procedure including step A, step B and step C from the troubleshooting solution that is shown on the display unit 102 of the wearable electronic device 10. On the other hand, in case of another one machine 3 having serial number of 2 being in a failure state, the field maintenance engineer who wears the wearable electronic device 10 is guided to finish a troubleshooting procedure including step B, step C and step D from the troubleshooting solution. Briefly speaking, the failure causes analyzing unit 113 would not produce the same troubleshooting solution for two different machines according to the data of machine failure causes and the data of machine maintenance records. As a result, not only is the machine failure analyzing system 1 of the present invention helpful in shortening a whole time of completing the troubleshooting, the field maintenance engineer is also prevented from arbitrarily replacing old machine part(s) with new machine part(s) or change machine settings without authorization prior to finding the exact failure causes of the machine that is malfunctioning.

It needs to be further explained that, the above descriptions have introduced that the machine 3 is provided with a plurality of sensors 31, and the plurality of sensors 31 are configured for sensing at least one machine status of the machine 3, so as to transmit the plurality of machine status data to the machine status data collecting unit 101. In general, the plurality of machine status data includes at least one normal machine malfunction status and an urgent machine malfunction status. Moreover, the forgoing descriptions mean that the machine status data collecting unit 101 is a sensing data receiving interface. However, in one practicable embodiment, the machine status data collecting unit 101 can also be a sensor controlling device, and is configured for controlling the plurality of sensors 31 that are integrated in the machine 3.

In a specific case, however, the field maintenance engineer (i.e., the user 2) may still fail to achieve the troubleshooting of the machine 3 in spite of receiving the troubleshooting solution that is shown on the display unit 102 of the wearable electronic device 10. In such case, the field maintenance engineer is able to utilize an image capturing module, a sound capturing module or a camera of the wearable electronic device 10 to report a current machine status to a central control system (i.e., the controlling and processing device 11) that is disposed in headquarters. As such, a senior engineer who is in headquarters can find relative failure causes according to the reported machine status relying on his years of experience, thereby providing a best troubleshooting solution to the field maintenance engineers through the first communication unit 103 of the wearable electronic device 10.

Moreover, FIG. 2 also depicts that the wearable electronic device 10 further includes an information feedback unit 104, such that the user 2 is able to utilize the information feedback unit 104 to unload an exact machine failure cause to the controlling and processing device 11 after completing a troubleshooting of the machine. Moreover, from FIG. 2, it is understood that the controlling and processing device 11 further includes a self-learning unit 115 that is coupled to the processor unit 112 and the machine history database 114. By such arrangement, the self-learning unit 115 is configured to update the data of machine malfunction status, the data of machine failure causes, and/or the data of machine maintenance records that are stored in the machine history database 114 after the exact machine failure cause is uploaded to the controlling and processing device 11.

In general, the failure causes analyzing unit 113 and the self-learning unit 115 are edited to a form of firmware, function library, or application program so as to be established in the controlling and processing device 11. As such, the controlling and processing device 11 is not limited to a central control system. In one practicable embodiment, the controlling and processing device 11 can be an industrial computer, a server computer, a desk computer, a laptop computer, a tablet computer, or a smart phone. On the other hand, if the wearable electronic device 10 has a high-performance CPU, the forgoing failure causes analyzing unit 113 and the self-learning unit 115 can also be edited to a form of firmware, function library, or application program so as to be established in the wearable electronic device 10. As a result, the wearable electronic device 10 is provided with a failure analyzing function.

Wearable Electronic Device Having Machine Failure Analyzing Function

Figure 4:
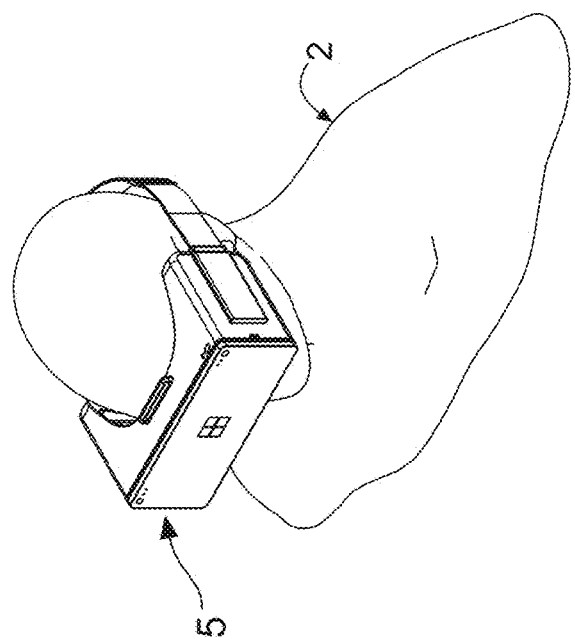
FIG. 4 shows a framework view of a wearable electronic device having machine failure analyzing function according to the present invention.
Figure 4:
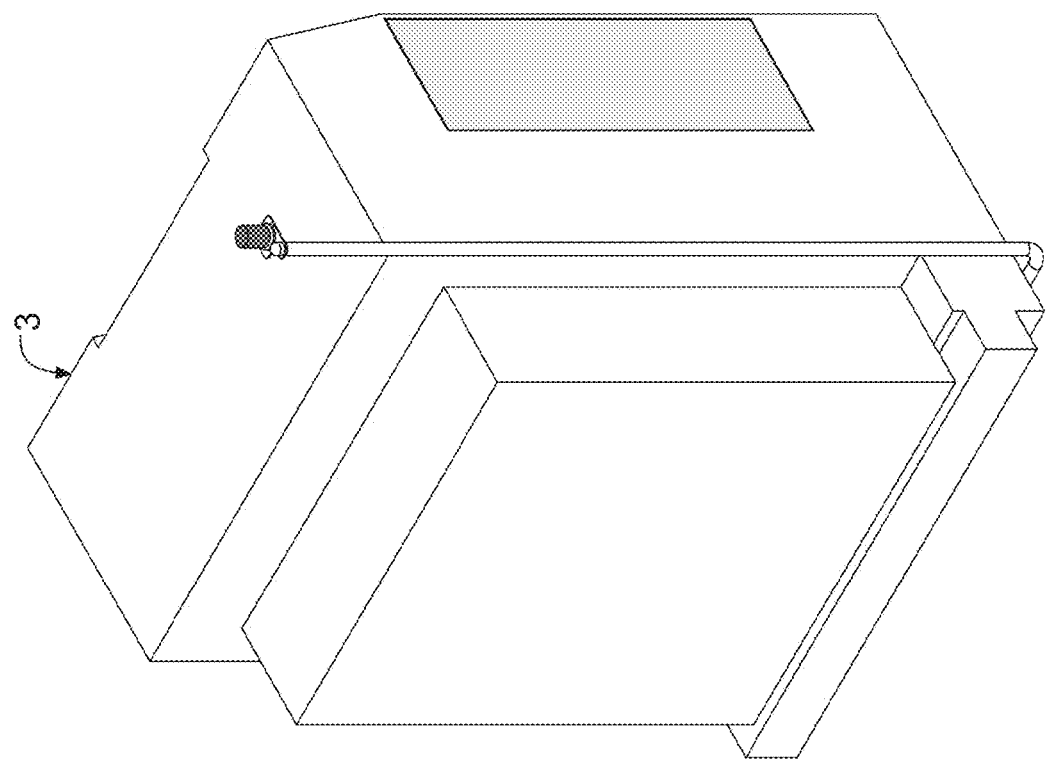
Figure 5:
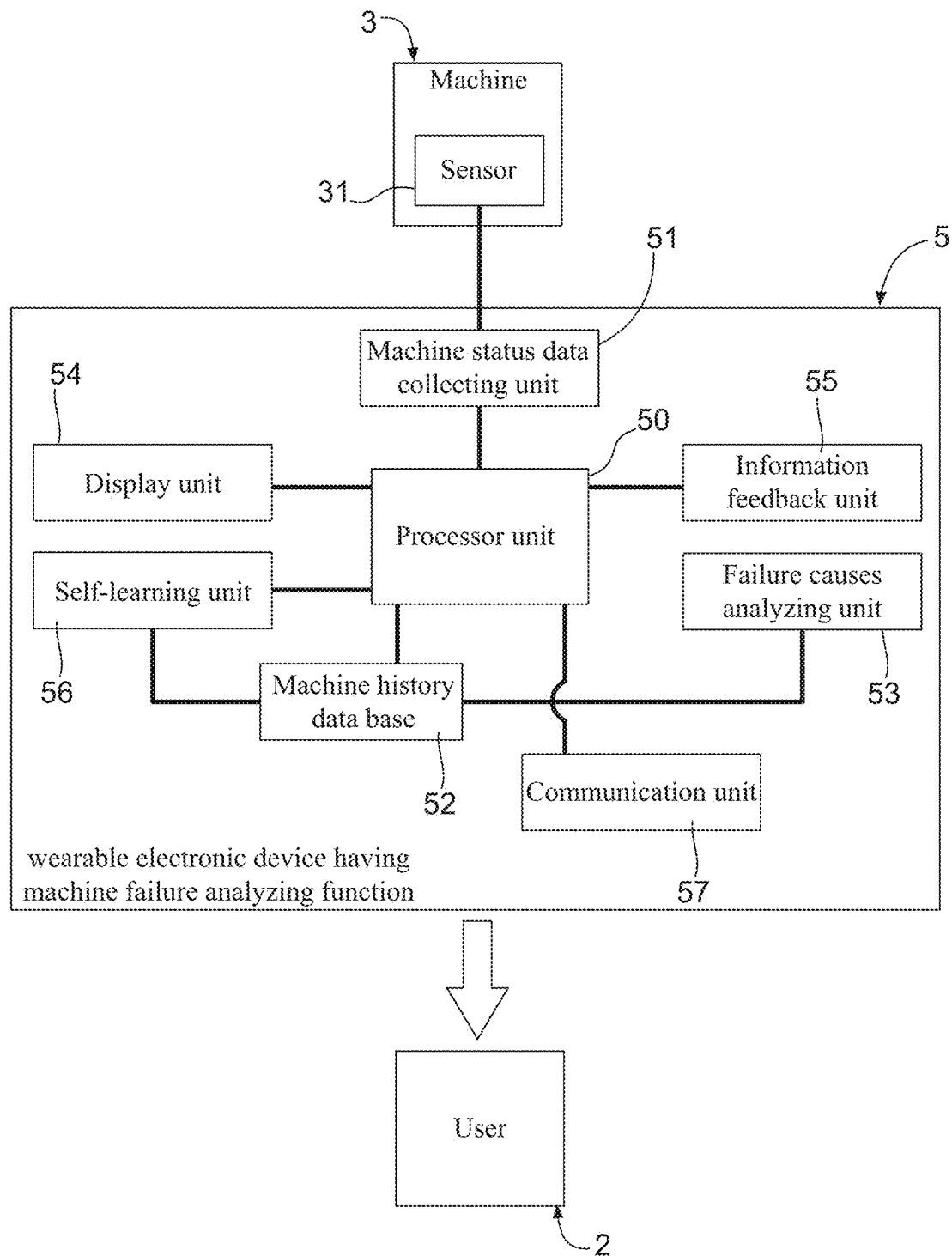
FIG. 5 shows a function block diagram of the wearable electronic device having machine failure analyzing function.

With reference to FIG. 4, there is shown a framework view of a wearable electronic device having machine failure analyzing function. Moreover, FIG. 5 shows a function block diagram of the wearable electronic device having machine failure analyzing function. As FIG. 4 and FIG. 5 show, the wearable electronic device 5 is for a user 2 (i.e., a field maintenance engineer) to wear, and includes a processor unit 50, a machine status data collecting unit 51, a machine history database 52, a failure causes analyzing unit 53, a display unit 54, an information feedback unit 55, a self-learning unit 56, a communication unit 57. In which, the machine status data collecting unit 51 is selected from the group consisting of a sensing data receiving module, an image capturing module, a sound capturing module, and a camera.

As described more in detail below, the machine history database 52 is coupled to the processor unit 50, and there are a plurality of data of machine malfunction status, a plurality of data of machine failure causes, and a plurality of data of machine maintenance records stored in the machine history database 52. Moreover, the failure causes analyzing unit 53 is coupled to the processor unit 50 and the machine history database 52, and the display unit 54 is coupled to the processor unit 50. On the other hand, the information feedback unit 55 is coupled to the processor unit, and the self-learning unit 56 is coupled to the processor unit 50 and the machine history database 52. In case of the machine 3 is malfunctioning or in a failure status, the sensors 31 show a failure or malfunction alarm, such that the wearable electronic device 10 utilizes the machine status data collecting unit 51 to collect machine status data from the sensors 31. Subsequently, the failure causes analyzing unit 53 finds the data of machine failure causes with respect to the machine status data from the machine history database 52, thereby generating at least one troubleshooting solution after the data of machine maintenance records that are corresponding to the data of machine failure causes having been found from the machine history database 52. Consequently, the processor unit 50 transmits the troubleshooting solution to the display unit 54, such that the troubleshooting solution is able to be shown on the display unit 54 by a mixed reality way. As such, under instructions of the troubleshooting solution, the user 2 (i.e., a field maintenance engineer) who wears the wearable electronic device 10 can achieve the troubleshooting of the machine 3 rapidly and precisely, without needing to spend time reading a repair and maintenance manual of the machine in order to find the failure causes.

It needs to be further explained that, the above descriptions have introduced that the machine 3 is provided with a plurality of sensors 31, and the plurality of sensors 31 are configured for sensing at least one machine status of the machine 3, so as to transmit the plurality of machine status data to the machine status data collecting unit 51. The forgoing descriptions mean that the machine status data collecting unit 51 is a sensing data receiving interface. However, in one practicable embodiment, the machine status data collecting unit 51 can also be a sensor controlling device, and is configured for controlling the plurality of sensors 31 that are integrated in the machine 3. As explained more in detail below, the machine status data collecting unit 51 can also be an independent module or device, and is not needed to be integrated in the wearable electronic device 5. The independent machine status data collecting 51 can also be configured for controlling the plurality of sensors 31, and then transmit the sensing data to the wearable electronic device 5.

In a specific case, however, the field maintenance engineer (i.e., the user 2) may still fail to achieve the troubleshooting of the machine 3 in spite of receiving the troubleshooting solution that is shown on the display unit 54 of the wearable electronic device 10. In such case, the field maintenance engineer is able to utilize an image capturing module, a sound capturing module or a camera of the wearable electronic device 10 to report a current machine status to a central control system that is disposed in headquarters. As such, a senior engineer who is in headquarters can find relative failure causes according to the reported machine status relying on his years of experience, thereby providing a best troubleshooting solution to the field maintenance engineers through the communication unit 57 of the wearable electronic device 10.

In addition, the user 2 (i.e., the field maintenance engineer) who wears the wearable electronic device 5 is able to utilize the information feedback unit 55 to unload an exact machine failure cause to the processor unit 50 after completing a troubleshooting of the machine. Moreover, from FIG. 4, it is understood that the wearable electronic device 5 further includes a self-learning unit 56 that is processor unit 50 and the machine history database 52. By such arrangement, the self-learning unit 56 is configured to update the wherein the data of machine malfunction status, the data of machine failure causes, and/or the data of machine maintenance records that are stored in the machine history database 52 after the exact machine failure cause being uploaded to the processor unit 50.

The above description is made on embodiments of the present invention. However, the embodiments are not intended to limit scope of the present invention, and all equivalent implementations or alterations within the spirit of the present invention still fall within the scope of the present invention.

What is claimed is:

1. A machine failure analyzing system, comprising:
a machine status data collecting unit, being configured for collecting a plurality of machine status data from at least one machine;
at least one wearable electronic device, being for a user to wear, and having a first communication unit; and
a controlling and processing device, comprising:
a second communication unit, being used for communicating with the first communication unit;
a processor unit, being coupled to the second communication unit;
a failure causes analyzing unit, being coupled to the processor unit; and
a machine history database, being coupled to the failure causes analyzing unit and the processor unit, wherein there are a plurality of data of machine malfunction status, a plurality of data of machine failure causes, and a plurality of data of machine maintenance records stored in the machine history database;
wherein the processor unit receives the machine status data from the machine status data collecting unit through the second communication unit and the first communication unit, such that the failure causes analyzing unit finds the data of machine failure causes with respect to the machine status data from the machine history database, thereby generating at least one troubleshooting solution after subsequently finding the data of machine maintenance records that correspond to the data of machine failure causes;
wherein the processor unit transmits the troubleshooting solution to the wearable electronic device through the second communication unit and the first communication unit.

2. The machine failure analyzing system of claim 1, wherein the machine is provided with a plurality of sensors, and the plurality of sensors are configured for sensing at least one machine status of the machine, and transmitting the plurality of machine status data to the machine status data collecting unit.

3. The machine failure analyzing system of claim 1, wherein the machine status data collecting unit is selected from the group consisting of a sensing data receiving module, an image capturing module, a sound capturing module, and a camera.

4. The machine failure analyzing system of claim 1, wherein the plurality of data of machine malfunction status comprises at least one normal machine malfunction status and an urgent machine malfunction status.

5. The machine failure analyzing system of claim 1, wherein the wearable electronic device further comprises a display unit, wherein the troubleshooting solution is shown on the display unit by a mixed reality way.

6. The machine failure analyzing system of claim 5, wherein the troubleshooting solution comprises: a plurality of machine failures causes that are sequentially arranged and a plurality of machine maintenance records that are respectively relative to the plurality of machine failures.

7. The machine failure analyzing system of claim 1, wherein the wearable electronic device further comprises an information feedback unit, such that the user is able to utilize the information feedback unit to unload an exact machine failure cause to the controlling and processing device after completing a troubleshooting of the machine.

8. The machine failure analyzing system of claim 7, wherein the controlling and processing device further comprises a self-learning unit that is coupled to the processor unit and the machine history database; wherein the self-learning unit is configured to update the wherein the data of machine malfunction status, the data of machine failure causes, and/or the data of machine maintenance records that are stored in the machine history database after the exact machine failure cause being uploaded to the controlling and processing device.

9. The machine failure analyzing system of claim 1, wherein both the first communication unit and the second communication are selected from the group consisting of a wired communication interface and a wireless communication interface.

10. The machine failure analyzing system of claim 1, wherein the controlling and processing device is selected from the group consisting of a central control system, an industrial computer, a server computer, a desk computer, a laptop computer, a tablet computer, and a smart phone.

11. The machine failure analyzing system of claim 7, wherein the failure causes analyzing unit and the self-learning unit are edited to a form of firmware, a function library, or an application program so as to be established in the controlling and processing device.

\* \* \* \* \*